United States Patent [19]

Lazenby et al.

[11] 4,113,130

[45] Sep. 12, 1978

[54] JOINT FOR A NESTABLE CARGO CARRIER

[75] Inventors: Webber W. Lazenby, Tulsa; Daniel N. Pulliam, Broken Arrow, both of Okla.

[73] Assignee: McDonnell Douglas Corporation, Long Beach, Calif.

[21] Appl. No.: 820,930

[22] Filed: Aug. 1, 1977

[51] Int. Cl.² ............................ B65D 7/02; B64D 37/02
[52] U.S. Cl. ............................ 220/5 A; 220/75; 220/81 R; 244/135 R
[58] Field of Search ............ 244/137 R, 118 R, 135 R; 220/4 F, 5 R, 5 A, 8, 75, 76, 80, 81

[56] References Cited

U.S. PATENT DOCUMENTS

| 2,123,035 | 7/1938 | Ashley | 220/75 |
| 2,471,296 | 5/1949 | Allen et al. | 220/5 |
| 2,541,371 | 2/1951 | Kops | 220/5 |
| 2,591,044 | 4/1952 | Bombardt et al. | 220/81 R |
| 2,596,839 | 5/1952 | Clausen | 220/75 |
| 2,597,482 | 5/1952 | Harrison et al. | 220/81 R |
| 2,648,454 | 8/1953 | Dean | 220/5 |
| 2,653,541 | 9/1953 | Kanode et al. | 220/5 |
| 2,661,115 | 12/1953 | Fletcher | 220/5 |
| 2,686,609 | 8/1954 | Fletcher | 220/5 |
| 2,700,458 | 1/1955 | Brown | 220/5 |
| 2,710,096 | 6/1955 | Lankford | 220/5 |
| 2,756,893 | 7/1956 | Barrere | 220/5 |
| 2,781,935 | 2/1957 | Spieth et al. | 220/5 |
| 2,832,503 | 4/1958 | Bauman | 220/80 |
| 2,895,635 | 7/1959 | Pollard | 220/81 R |
| 2,915,152 | 12/1959 | Graham | 220/75 |
| 2,952,427 | 9/1960 | Armstrong | 244/135 R |
| 2,955,787 | 10/1960 | Ray et al. | 244/135 R |
| 2,984,439 | 5/1961 | Fletcher | 244/135 R |
| 3,005,406 | 10/1961 | Ronfeldt | 220/8 |
| 3,098,632 | 7/1963 | Christenson | 244/135 R |
| 3,372,828 | 3/1968 | Pechacek et al. | 220/75 |
| 3,469,730 | 9/1969 | Neff et al. | 220/5 |

Primary Examiner—Galen L. Barefoot
Attorney, Agent, or Firm—Paul T. Loef; Walter J. Jason; Donald L. Royer

[57] ABSTRACT

A joint for a nestable cargo carrier including a plurality of circular sections conically shaped to form an ogive contour when nested, one within the other. The shell segments are bolted together to provide the present positive mechanical joint, reliable joint sealing and ease of field assembly.

4 Claims, 8 Drawing Figures

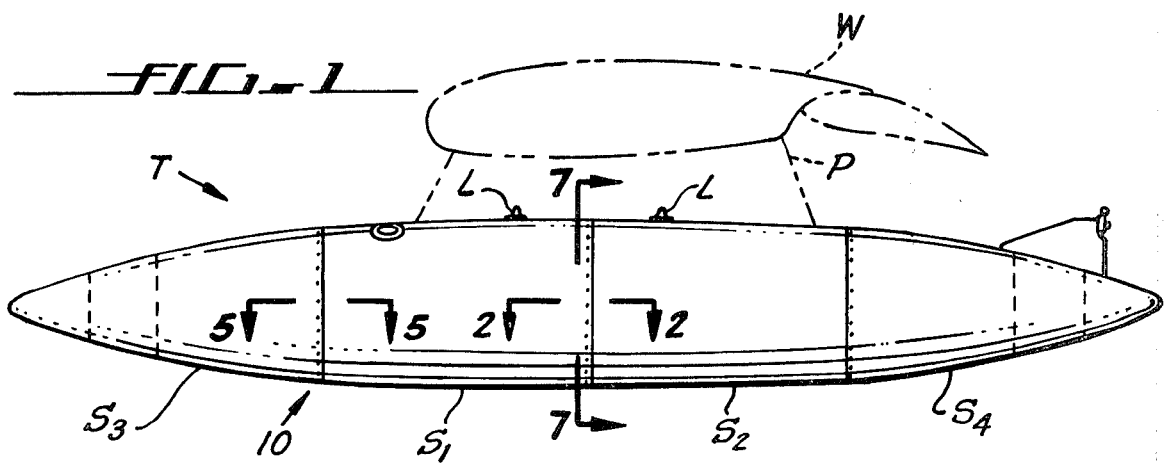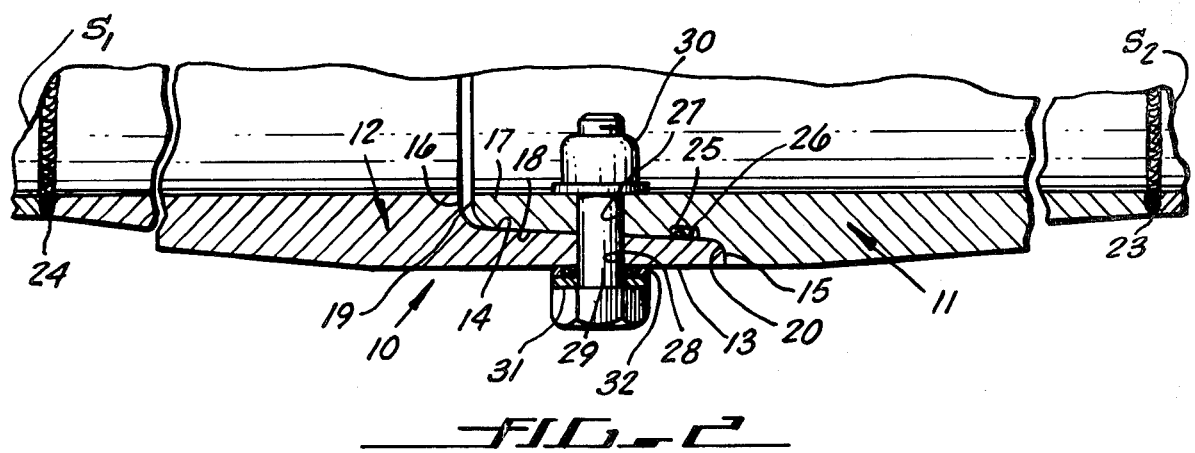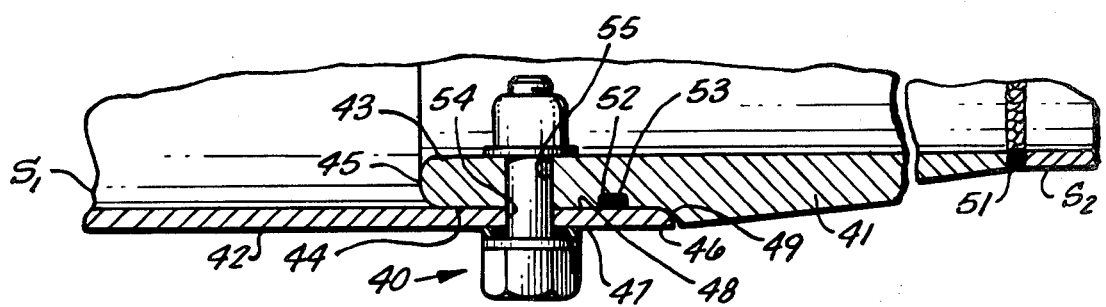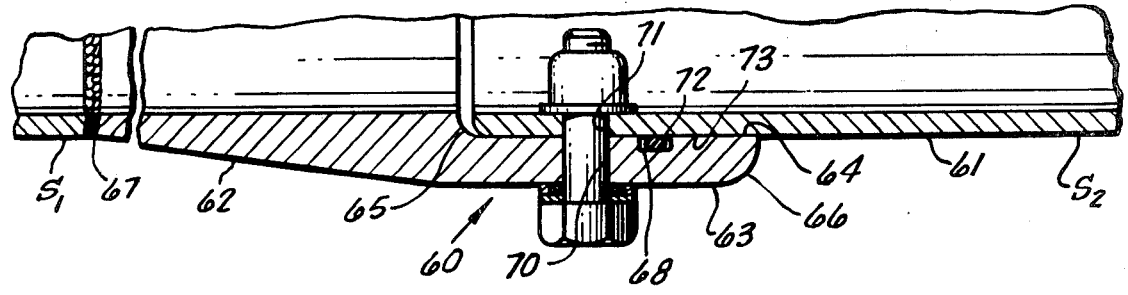

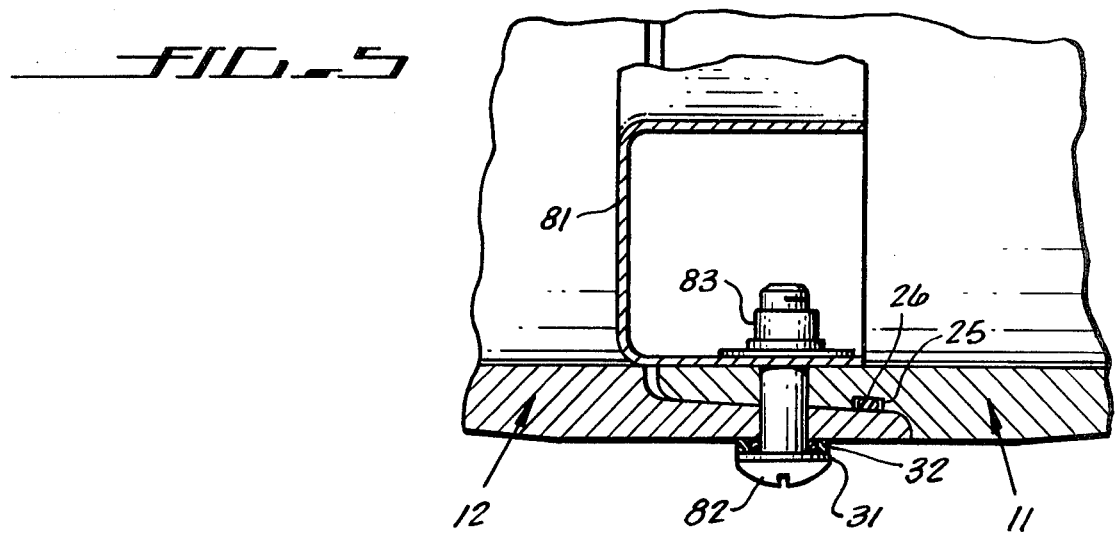
FIG_5
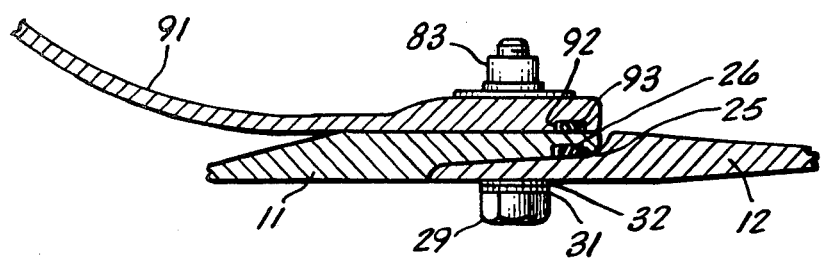
FIG_6
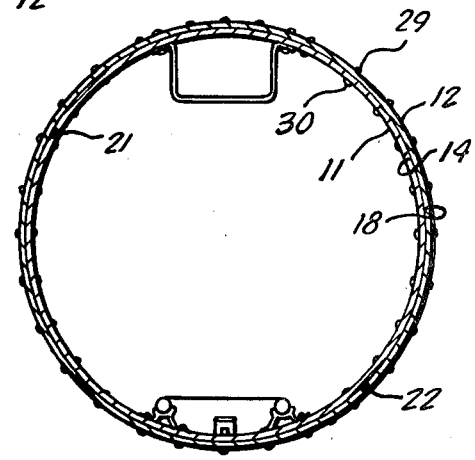
FIG_7
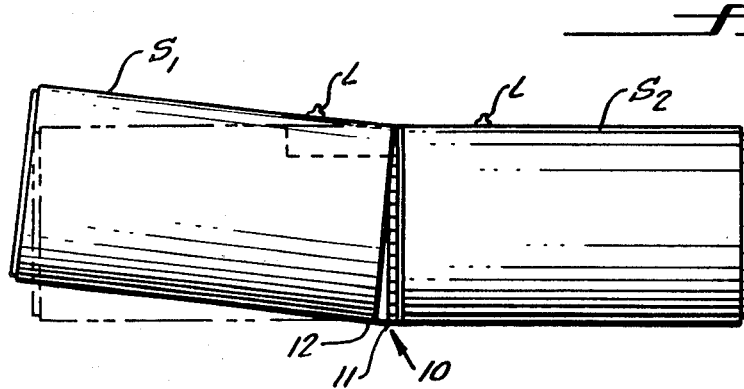
FIG_8

JOINT FOR A NESTABLE CARGO CARRIER

BACKGROUND OF THE PRESENT INVENTION

This invention relates generally to improvement in cargo carriers for external mounting on aircraft and is particularly directed to a joint for shaped tank constructions for nested packaging.

Presently existing aircraft jettisonable fuel tanks are manufactured from sections of cylindrical or elliptical sections secured together by some type of tension device. Typical tension devices include a split clamp circumscribing flanges on the distal ends of the sections joined as in U.S. Pat. No. 3,469,730 to Neff, et al, or some type of longitudinal tension device running through the tank, as disclosed in U.S. Pat. No. 2,653,541 to Kanode, et al, all of which lack a positive mechanical structural joint. The lack of a positive structural joint may permit the sections to separate or leak in certain flight maneuvers due to resultant bending stresses at the joints. As a result, flight restrictions are imposed restricting aircraft performance in terms of maneuvering load factors, especially when fully fueled. Further restrictions are also present which limit tank jettisoning to a very narrow flight envelope.

The lack of a positive mechanical joint at the tank sections also creates a serious lightning strike problem, since the prior joint designs inherently do not assure a high quality electrical bond between tank sections. Since lightning strikes are primarily to a nose cone portion of the tank, and secondarily to the tank aft cone, any electrical charge will travel to the airframe attach section. Since this section is at airframe potential, unless a high quality bond exists between sections, arcing will occur across the joints with possible catastrophic detonation of a fuel/air mixture in the tank.

The tank section joint concept, to a large degree, also defines the fluid sealing problem. Leakage problems have been particularly prevalent where longitudinal joints are used in combination with peripheral joints due to intersecting seals.

In summary, contemporary aircraft external fuel tanks have problems of excessive shipping space, slow assembly, seal leakage, lack of positive mechanical structural joints, and lack of lightning resistance compatibility.

SUMMARY OF THE PRESENT INVENTION

It is an important object of the present invention to provide a positive, mechanically fastened structural joint to meet the structural requirements of high performance supersonic aircraft. The invention enables creation of sealed joints, useful under adverse loads, to prevent fluid leakage, and to provide a high-quality bond by metal to metal contact between sections to eliminate lightning induced arc paths.

Another important object of the present improved cargo carrier joint is to provide improved nesting ratios when the tanks are disassembled and stored by establishing tapered shapes throughout.

A further object of this invention is to minimize assembly operations at the field level and to maximize the simplicity of the operations and tools required.

Another object of this invention is to provide a pressure-operated, ejectable, external cargo tank which, when used for retention of fuel, has gravity and inflight refueling capabilities and which can be readily disassembled and nested in multiples for logistic advantages.

In summary, the joint of this invention accomplishes the above objects and overcomes the disadvantage of prior devices by providing a plurality of telescoping joints containing an annular O-ring, to seal the section joint, in cooperation with a plurality of positive bolted connections between adjacent tank sections to carry structural loads. The bolted connections also provide a positive metal-to-metal connection between sections to assure a high quality electrical bond between such sections in the event of lightning strikes. The bolt penetrations of the tank sections are sealed by contained O-rings intermediate the bolt heads and joint sections. The joint portions in the area of telescopic engagement are conically tapered with respect to the longitudinal axis of the section to ease field assembly of large diameter joints. This arrangement also permits a relaxation of manufacturing tolerances.

BRIEF DESCRIPTION OF THE DRAWINGS

With reference to the drawings, wherein like reference numerals designate like portions of the invention:

FIG. 1 is a side elevational view of an external fuel tank attached to a section of a typical aircraft wing;

FIG. 2 is an enlarged, fragmentary, sectional view taken substantially as indicated by line 2—2, FIG. 1;

FIGS. 3 and 4 are enlarged, fragmentary, sectional views showing alternate embodiments of the joint elements of the invention;

FIG. 5 is an enlarged, fragmentary, sectional view taken substantially along line 5—5, FIG. 1, and showing the joint of FIG. 2 in conjunction with a channel section stiffener;

FIG. 6 is an enlarged, fragmentary, sectional view taken substantially along line 2—2, FIG. 1, and showing an alternative embodiment wherein an internal bulkhead is employed in conjunction with the joint;

FIG. 7 is a transverse sectional view taken substantially along line 7—7, FIG. 1; and FIG. 8 is an elevational view illustrating the method of assembling typical carrier sections.

DESCRIPTION OF THE INVENTION

The invention is shown in assembled and in an aircraft-installed configuration in FIG. 1 and comprises a nestable fuel tank assembly T which includes a forward main section $S_1$, aft main section $S_2$, nose cone section $S_3$, and aft cone section $S_4$ attached by means of a pair of lugs L to a pylon P, which in turn is attached to an aircraft wing W.

With reference to the embodiment of the invention illustrated in FIGS. 2 and 7, the tank sections $S_1$ through $S_4$ are typically joined by a joint assembly 10 which includes a male joint element 11 telescopically engaged with a female element 12. The female joint portion 13 of the female element 12 has a conically tapered engaged surface 14 which terminates in a contoured shape at both a distal end 15 and an opposite end 16. A male joint portion 17 of the male element 11 has a similar mating shape with a conically tapered engaged surface 18, also terminating in contoured shapes at both a distal end 19 and an opposite end 20. Both male and female joint portions describe a frustro-conical shape. The joint thus formed provides a smooth transition from one tank section to another, minimizing stress risers and aerodynamic interruptions. The conically tapered mating surfaces 14 and 18 facilitate installation and assembly of the large diameter tank sections and a relaxation of manufacturing tolerances.

The joint elements 11 and 12 may be fabricated from extrusions annularly formed and butt welded as shown at 21 and 22, FIG. 7, to form a ring. The formed joint elements are then welded to the open end of the tank sections $S_1$ through $S_4$ by welds, as shown at 23 and 24, to form integral distal ends of the tank sections.

One of the engaged surfaces 14 or 18 of the joint elements 11 or 12, preferably the male surface 18, as it better alleviates O-ring extrusion during assembly, is provided with an annular groove 25 located intermediate a plurality of radially extending holes 27 and the distal end 15 of the mating joint element 12. The groove 25 serves to accept and retain O-ring sealing means 26.

Both joint elements 11 and 12 are provided with a plurality of radially aligned and mating holes 27 and 28 respectively, each of which, in turn, accepts a bolt 29 fitted with a nut 30 to form a positive structural locking means. The number of bolt fasteners 29 required is determined by the stress at the joint as a result of imposed flight loads. However, a sufficient number of fasteners must be employed to insure effective metal-to-metal contact between the engaged joint surfaces 14 and 18, circumferentially around the joint, to assure proper sealing and electrical continuity, as shown in FIG. 7. The fastener assembly is provided with a washer 31 located immediately under the head of the bolt 29 and sealing means 32 installed between the washer 31 and the outer surface of the joint element 12 to seal the bolt holes. The sealing means 32 may be a contained O-ring.

The improved tank joint has been constructed and tested in a full scale tank section duplicating a cone-to-center section joint. Test loads were applied resulting in 187% of ultimate inflight bending moments and 107% of ultimate jettison condition bending moments. No structural failures nor joint leakage occurred under these loads. It was also determined, during the assembly of the improved tank joint that no assembly problems existed.

Another embodiment of a joint assembly, indicated at 40, is shown in FIG. 3. This embodiment comprises a male joint element 41 telescopically engaged with a female element 42. A male joint portion 43 of the male element 41 has a cylindrically shaped engaged surface 44 which terminates in a radially contoured distal end 45 and a rounded shoulder 46 at its opposite end, to accomodate assembly of the joint. A female joint portion 47 of the female element 42 also has a cylindrically shaped engaged surface 48 which is formed by sizing the distal end of the tank section $S_1$ to permit a slip fit over the male joint 41, terminating its distal end 49 in a contour, generally, to match the mating shoulder 46 of the male element 41 to provide a smooth joint.

The male joint element 41 may be fabricated from an extrusion roll-formed and butt welded to form a cylindrical section which is circumferentially welded, as at 51, to form the integral distal end of tank section $S_2$.

The male engaged surface 44 is provided with an annular groove 52 located intermediate a plurality of holes 55 and the distal end 49 of the female joint element 42. The groove 52 serves to accomodate an O-ring sealing means 53. Both joint elements 41 and 42 are provided with a plurality of radially aligned and mating holes 54 and 55 which contain fasteners and seals, all of which may be similar to that previously described in the embodiment of FIG. 2.

A further embodiment of the invention is shown in a joint assembly 60 shown in FIG. 4. This embodiment comprises a male joint element 61 telescopically engaged with a female joint element 62. A female joint portion 63 of the female joint element 62 has a cylindrically shaped engaged surface 64 terminating in a rounded shoulder 65 opposite the distal end 66. The female joint element 62 may be fabricated from an extrusion roll formed and butt welded to form a cylindrical section which may be welded as shown at 67 to form the integral distal end of the tank section $S_1$. In this embodiment, the female engaged surface 64 is provided with an annular groove 68 located midway between holes 70 and its distal end 66 which accepts an O-ring sealing means 72. The male joint element 61 has a cylindrically shaped engaged surface 73 which is formed by sizing the distal end of the tank section $S_2$ to assure desired deformation of the O-ring 72, when engaged. Both joint elements 61 and 62 are provided with a plurality of radially aligned and mating holes 70 and 71 which accomodate fasteners and sealing means as previously described in the embodiment of FIG. 2.

While all embodiments of the invention are shown as being constructed from metallic material, the tanks are preferably constructed from aluminum with inert gas arc welds; however, fiber reinforced plastics are suitable substitute materials.

A further alternative embodiment of the invention is shown in FIG. 5, wherein the joint assembly of FIG. 2 is employed in conjunction with a channel-shaped stiffener 81 running circumferentially around the inside of the tank and mating with the joint. This arrangement serves to strengthen the tank assembly and an additional alternative fastener means in the form of a screw 82 and nut plate 83 is reflected.

A still further embodiment of the invention is depicted in FIG. 6 where a bulkhead 91, provided with an annular groove 92 and sealing means 93 is used in conjunction with the joint shown in FIG. 2, to allow control of the polar moment of inertia of the loaded tank and to retain the aerodynamic shape of the conical tank.

The assembly procedure of two tank sections $S_1$ and $S_2$, employing the embodiment of FIG. 2, is shown in FIG. 8, wherein the engaged surfaces 14 and 17 of the joint elements 11 and 12 are conically shaped. The O-ring sealing means 26 is installed in the O-ring groove 25, provided in the male joint element 11 of $S_2$. The female joint element 12 of $S_1$ is then placed in slight longitudinal angular displacement with the axis of $S_2$ to permit engagement of the upper surfaces of the joint only. Two opposing holes are then aligned and the bolt 29 is inserted through the aligned holes. A downward force is then applied on the upper side of the distal end of $S_2$ until full engagement occurs and the balance of the bolts 29 are inserted as previously described.

It should be noted that throughout the showing and description of the several embodiments of the present invention, utilization has been made of O-ring type seals positioned in circumferential grooves in association with other elements for the present tank joint. It has been found that this type of seal is preferable to face-type seals for nested tanks where the external shape must be aerodynamically clean. The type of seal design, radial or face, is unimportant as long as it results in proper compression of the seal between the bottom of the groove and the cooperating surface of the second part which together confine the O-ring. Proper employment of face seals between tank sections necessitates protruding flanges or a compromise in controlling the seal compression or confinement. These problems are overcome by the radial O-ring type seal of the present invention.

It may thus be seen that the joint arrangement, depicted in the several embodiments of this invention, serve to solve the indicated problems encountered in the environment of their normal use.

We claim:

1. An aircraft cargo carrier assembly including a plurality of nestable cargo carrier sections detachably connected in end-to-end relations, and closure means connected to the respective remote ends of said connected cargo carrier members, a series of support ribs removably disposed internally of said cargo carrier members, wherein the improvement comprises:
   a pair of cooperating joint elements, said elements being frustro-conically shaped with respect to the longitudinal axis of the sections, and having contoured distal end portions, one of said elements having a male end, another of said elements having a female end and engageable telescopically with one of said elements;
   a plurality of radially aligned and cooperating openings through said telescopically engaged portions of said sections;
   bolts disposed radially through said openings to maintain engagement of said surfaces, each of said bolts being provided with an annular resilient seal between a head of each of said bolts and a radially outermost surface of one of said pair of elements, and
   annular sealing means disposed between said engaged opposed surfaces of said joint elements, said annular sealing means being disposed longitudinally between said distal ends of said joint elements and in longitudinal spaced relationship to said openings, whereby said joint provides a fluid-tight seal for said cargo carrier assembly and electrical continuity.

2. The joint as defined by claim 1, further comprising an annular circumferential groove opening in one of said engaged opposed surfaces for receiving said annular sealing means, said annular sealing means being an O-ring.

3. The joint as defined by claim 1, wherein each of said cooperating joint elements comprises an annularly formed extrusion welded to said section.

4. A fluid-tight joint for nestable sections of an aircraft auxiliary fuel tank comprising:
   a pair of cooperating joint elements, said elements being constructed from annularly formed extrusions and being secured to annular walls of said tank and forming ends for said sections of said tank, said elements being adapted for longitudinal telescopic interengagement and having circumferential elongated engaging surfaces, said surfaces being conically tapered, said elements having contoured distal end portions;
   a plurality of radially extending and aligned openings through said elements and across said engaging surfaces;
   bolts disposed through said openings radially to maintain engagement of said surfaces, each of said bolts being provided with an annular resilient seal between a head of said each of said bolts and a radially outermost surface of one of said pair of elements;
   an annular groove opening into the engaging surface of the radially innermost of said pair of elements, said groove being longitudinally positioned intermediate said plurality of openings and said distal end of said innermost of said elements; and
   a resilient O-ring disposed in said annular groove and engageable with said engaging surface of said outermost of said elements whereby, in addition to said annular seal in association with said heads of said bolts, to provide the liquid-tight seal for said tank sections.

* * * * *